(12) United States Patent
Sun et al.

(10) Patent No.: US 11,265,130 B2
(45) Date of Patent: Mar. 1, 2022

(54) TECHNIQUES FOR SHARED RADIO FREQUENCY SPECTRUM CHANNEL CONFIGURATION

(71) Applicant: QUALCOMM Incorporated, San Diego, CA (US)

(72) Inventors: Jing Sun, San Diego, CA (US); Huilin Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 93 days.

(21) Appl. No.: 16/790,296

(22) Filed: Feb. 13, 2020

(65) Prior Publication Data

US 2020/0266951 A1 Aug. 20, 2020

Related U.S. Application Data

(60) Provisional application No. 62/806,276, filed on Feb. 15, 2019.

(51) Int. Cl.
| | |
|---|---|
| *H04L 12/28* | (2006.01) |
| *H04L 5/00* | (2006.01) |
| *H04W 16/14* | (2009.01) |
| *H04W 76/27* | (2018.01) |
| *H04W 72/04* | (2009.01) |
| *H04L 27/26* | (2006.01) |
| *H04J 1/16* | (2006.01) |

(52) U.S. Cl.
CPC ........... *H04L 5/0053* (2013.01); *H04L 5/001* (2013.01); *H04L 5/005* (2013.01); *H04L 5/0092* (2013.01); *H04L 27/2662* (2013.01); *H04W 16/14* (2013.01); *H04W 72/042* (2013.01); *H04W 72/0453* (2013.01); *H04W 76/27* (2018.02)

(58) Field of Classification Search
CPC ............. H04W 16/14; H04W 72/1278; H04W 72/0453; H04L 5/0053
USPC ................................ 370/252, 329, 386, 430
See application file for complete search history.

(56) References Cited

U.S. PATENT DOCUMENTS

2019/0357264 A1* 11/2019 Yi ........................... H04L 5/001
2020/0052803 A1* 2/2020 Deenoo ............. H04W 74/0816
(Continued)

FOREIGN PATENT DOCUMENTS

WO 2018231036 A1 12/2018

OTHER PUBLICATIONS

International Search Report and Wrtten Opinion—PCT/US2020/018318—ISAEPO—dated Jun. 9, 2020.
(Continued)

*Primary Examiner* — John Pezzlo
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a base station (BS), information identifying a core resource set (CORESET) for one or more shared radio frequency spectrum channels. The CORESET may be configured into a plurality of resource blocks based at least in part on a resource block granularity associated with the one or more shared radio frequency spectrum channels. The UE may communicate with the BS using the CORESET. Numerous other aspects are provided.

31 Claims, 8 Drawing Sheets

(56) References Cited

U.S. PATENT DOCUMENTS

2020/0119895 A1 4/2020 Choi et al.
2020/0266959 A1* 8/2020 Yi .................... H04W 74/0833

OTHER PUBLICATIONS

LG Electronics: "RMSI Delivery and CORESET Configuration", 3GPP Draft, 3GPP TSG RAN WG1 Meeting #91, R1-1719894_LG RMSI CORESET Configuration_Final, 3rd Generation Partnership Project (3GPP), Mobile Competence Centre, 650, Route Des Lucioles, F-06921 Sophia-Antipolis Cedex, France, vol. RAN WG1. No. Reno, USA, Nov. 27, 2017-Dec. 1, 2017, Nov. 18, 2017, (Nov. 18, 2017), XP051369607, 16 Pages, Retrieved from the Internet: URL: http://www.3gpp.org/ftp/tsg%5Fran/WG1%5FRL1/TSGR1%5F91/Docs/, [retrieved on Nov. 18, 2017], pp. 3.9.

"RAN1 NR-Adhoc#3 (Sep. 2017)", 3GPP Draft, List of RAN1 Agreements, 3rd Generation Partnership Project (3GPP), Mobile Competence Centre, 650, Route Des Lucioles, F-06921 Sophia-Antipolis Cedex, France, vol. RAN WG1, No. , Sep. 1, 2017, Dec. 12, 2017 (Dec. 12, 2017), XP051670157, pp. 1-195, Retrieved from the Internet: URL: http://www.3gpp.org/ftp/tsg%5Fran/TSG%5FRAN/TSGR%5F78/Docs/RP%2D172461%2Ezip, [retrieved on Dec. 12, 2017], pp. 34.102.

* cited by examiner

TECHNIQUES FOR SHARED RADIO FREQUENCY SPECTRUM CHANNEL CONFIGURATION

CROSS-REFERENCE TO RELATED APPLICATION

This application claims priority to U.S. Provisional Application No. 62/806,276, filed on Feb. 15, 2019, entitled "TECHNIQUES FOR SHARED RADIO FREQUENCY SPECTRUM CHANNEL CONFIGURATION," which is hereby expressly incorporated by reference herein.

FIELD OF THE DISCLOSURE

Aspects of the present disclosure generally relate to wireless communication, and more particularly to techniques and apparatuses for shared radio frequency spectrum channel configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a base station (BS), information identifying a core resource set (CORESET) for one or more shared radio frequency spectrum channels, wherein the CORESET includes a plurality of resource blocks based at least in part on a resource block granularity associated with the one or more shared radio frequency spectrum channels; and communicating with the BS using the CORESET.

In a first aspect, communicating with the BS based at least in part on the CORESET comprises receiving, from the BS, a physical downlink control channel (PDCCH) communication based at least in part on monitoring a control region configured by the CORESET. In a second aspect, alone or in combination with the first aspect, the resource block granularity associated with the one or more shared radio frequency spectrum channels is different from a resource block granularity associated with a licensed frequency spectrum channel. In a third aspect, alone or in combination with one or more of the first or second aspects, a location of the CORESET, in a bandwidth part (BWP), is indicated relative to a reference frequency associated with the one or more shared radio frequency spectrum channels, and the reference frequency associated with the one or more shared radio frequency spectrum channels is different from a reference frequency associated with a licensed frequency spectrum channel.

In a fourth aspect, alone or in combination with one or more of the first through third aspects, the CORESET includes the plurality of resource blocks based at least in part on at least one of a subcarrier spacing associated with the one or more shared radio frequency spectrum channels or a number of subcarriers included in each resource block of the plurality of resource blocks. In a fifth aspect, alone or in combination with one or more of the first through fourth aspects, the information identifying the CORESET comprises a plurality of bits included in a bitmap, and the plurality of bits indicates the plurality of resource blocks.

In a sixth aspect, alone or in combination with one or more of the first through fifth aspects, a first bit, of the plurality of bits, is associated with a first resource block group that includes a starting resource block of a first shared radio frequency spectrum channel of the one or more shared radio frequency spectrum channels. In a seventh aspect, alone or in combination with one or more of the first through sixth aspects, a second bit, of the plurality of bits, is associated with a second resource block group that includes an ending resource block of the first shared radio frequency spectrum channel. In an eighth aspect, alone or in combination with one or more of the first through seventh aspects, the first bit and the second bit are based at least in part on a third bit associated with a third resource block group that includes a resource block index associated with a BWP in which the CORESET is included.

In a ninth aspect, alone or in combination with one or more of the first through eighth aspects, the first bit and the second bit are based at least in part on at least one of a channel frequency associated with the first shared radio frequency spectrum channel and a channel bandwidth associated with the first shared radio frequency spectrum channel. In a tenth aspect, alone or in combination with one or more of the first through ninth aspects, the plurality of bits included in the bitmap is based at least in part on at least one of the resource block granularity that is used to configure the CORESET, a number of resource blocks included in the plurality of resource blocks, a number of resource block groups included in the plurality of resource blocks, a respective number of resource blocks, on each side of a channel frequency associated with a first shared radio frequency spectrum channel of the one or more shared radio frequency spectrum channels, included in the CORESET, or a respective number of resource block groups, on each side of the channel frequency associated with the first shared radio frequency spectrum channel, included in the CORESET.

In an eleventh aspect, alone or in combination with one or more of the first through tenth aspects, a first shared radio frequency spectrum channel of the one or more shared radio frequency spectrum channels shares, with a second shared radio frequency spectrum channel of the one or more shared radio frequency spectrum channels, at least one of a resource block index, a number of resource blocks, or a number of resource block groups. In a twelfth aspect, alone or in combination with one or more of the first through eleventh aspects, the information identifying the CORESET is included in at least one of a radio resource control (RRC) communication, a medium access control control element (MAC-CE) communication, or a downlink control information (DCI) communication.

In a thirteenth aspect, alone or in combination with one or more of the first through twelfth aspects, a control channel resource allocation granularity associated with the one or more shared radio frequency spectrum channels is different from a control channel resource allocation granularity associated with a licensed frequency spectrum channel.

In some aspects, a UE for wireless communication may include memory and one or more processors operatively coupled to the memory. The memory and the one or more processors may be configured to receive, from a BS, information identifying a CORESET for one or more shared radio frequency spectrum channels, wherein the CORESET includes a plurality of resource blocks based at least in part on a resource block granularity associated with the one or more shared radio frequency spectrum channels; and communicate with the BS using the CORESET.

In a first aspect, communicating with the BS based at least in part on the CORESET comprises receiving, from the BS, a PDCCH communication based at least in part on monitoring a control region configured by the CORESET. In a second aspect, alone or in combination with the first aspect, the resource block granularity associated with the one or more shared radio frequency spectrum channels is different from a resource block granularity associated with a licensed frequency spectrum channel. In a third aspect, alone or in combination with one or more of the first or second aspects, a location of the CORESET, in a BWP, is indicated relative to a reference frequency associated with the one or more shared radio frequency spectrum channels, and the reference frequency associated with the one or more shared radio frequency spectrum channels is different from a reference frequency associated with a licensed frequency spectrum channel.

In a fourth aspect, alone or in combination with one or more of the first through third aspects, the CORESET includes the plurality of resource blocks based at least in part on at least one of a subcarrier spacing associated with the one or more shared radio frequency spectrum channels or a number of subcarriers included in each resource block of the plurality of resource blocks. In a fifth aspect, alone or in combination with one or more of the first through fourth aspects, the information identifying the CORESET comprises a plurality of bits included in a bitmap, and the plurality of bits indicates the plurality of resource blocks.

In a sixth aspect, alone or in combination with one or more of the first through fifth aspects, a first bit, of the plurality of bits, is associated with a first resource block group that includes a starting resource block of a first shared radio frequency spectrum channel of the one or more shared radio frequency spectrum channels. In a seventh aspect, alone or in combination with one or more of the first through sixth aspects, a second bit, of the plurality of bits, is associated with a second resource block group that includes an ending resource block of the first shared radio frequency spectrum channel. In an eighth aspect, alone or in combination with one or more of the first through seventh aspects, the first bit and the second bit are based at least in part on a third bit associated with a third resource block group that includes a resource block index associated with a BWP in which the CORESET is included.

In a ninth aspect, alone or in combination with one or more of the first through eighth aspects, the first bit and the second bit are based at least in part on at least one of a channel frequency associated with the first shared radio frequency spectrum channel and a channel bandwidth associated with the first shared radio frequency spectrum channel. In a tenth aspect, alone or in combination with one or more of the first through ninth aspects, the plurality of bits included in the bitmap is based at least in part on at least one of the resource block granularity that is used to configure the CORESET, a number of resource blocks included in the plurality of resource blocks, a number of resource block groups included in the plurality of resource blocks, a respective number of resource blocks, on each side of a channel frequency associated with a first shared radio frequency spectrum channel of the one or more shared radio frequency spectrum channels, included in the CORESET, or a respective number of resource block groups, on each side of the channel frequency associated with the first shared radio frequency spectrum channel, included in the CORESET.

In an eleventh aspect, alone or in combination with one or more of the first through tenth aspects, a first shared radio frequency spectrum channel of the one or more shared radio frequency spectrum channels shares, with a second shared radio frequency spectrum channel of the one or more shared radio frequency spectrum channels, at least one of a resource block index, a number of resource blocks, or a number of resource block groups. In a twelfth aspect, alone or in combination with one or more of the first through eleventh aspects, the information identifying the CORESET is included in at least one of an RRC communication, a MAC-CE communication, or a DCI communication.

In a thirteenth aspect, alone or in combination with one or more of the first through twelfth aspects, a control channel resource allocation granularity associated with the one or more shared radio frequency spectrum channels is different from a control channel resource allocation granularity associated with a licensed frequency spectrum channel.

In some aspects, a non-transitory computer-readable medium may store one or more instructions for wireless communication. The one or more instructions, when executed by one or more processors of a UE, may cause the one or more processors to: receive, from a BS, information identifying a CORESET for one or more shared radio frequency spectrum channels, wherein the CORESET includes a plurality of resource blocks based at least in part on a resource block granularity associated with the one or more shared radio frequency spectrum channels; and communicate with the BS using the CORESET.

In a first aspect, communicating with the BS based at least in part on the CORESET comprises receiving, from the BS, a PDCCH communication based at least in part on monitoring a control region configured by the CORESET. In a second aspect, alone or in combination with the first aspect, the resource block granularity associated with the one or more shared radio frequency spectrum channels is different from a resource block granularity associated with a licensed frequency spectrum channel. In a third aspect, alone or in combination with one or more of the first or second aspects, a location of the CORESET, in a BWP, is indicated relative to a reference frequency associated with the one or more shared radio frequency spectrum channels, and the reference frequency associated with the one or more shared radio frequency spectrum channels is different from a reference frequency associated with a licensed frequency spectrum channel.

In a fourth aspect, alone or in combination with one or more of the first through third aspects, the CORESET includes the plurality of resource blocks based at least in part on at least one of a subcarrier spacing associated with the one or more shared radio frequency spectrum channels or a number of subcarriers included in each resource block of the plurality of resource blocks. In a fifth aspect, alone or in combination with one or more of the first through fourth aspects, the information identifying the CORESET comprises a plurality of bits included in a bitmap, and the plurality of bits indicates the plurality of resource blocks.

In a sixth aspect, alone or in combination with one or more of the first through fifth aspects, a first bit, of the plurality of bits, is associated with a first resource block group that includes a starting resource block of a first shared radio frequency spectrum channel of the one or more shared radio frequency spectrum channels. In a seventh aspect, alone or in combination with one or more of the first through sixth aspects, a second bit, of the plurality of bits, is associated with a second resource block group that includes an ending resource block of the first shared radio frequency spectrum channel. In an eighth aspect, alone or in combination with one or more of the first through seventh aspects, the first bit and the second bit are based at least in part on a third bit associated with a third resource block group that includes a resource block index associated with a BWP in which the CORESET is included.

In a ninth aspect, alone or in combination with one or more of the first through eighth aspects, the first bit and the second bit are based at least in part on at least one of a channel frequency associated with the first shared radio frequency spectrum channel and a channel bandwidth associated with the first shared radio frequency spectrum channel. In a tenth aspect, alone or in combination with one or more of the first through ninth aspects, the plurality of bits included in the bitmap is based at least in part on at least one of the resource block granularity that is used to configure the CORESET, a number of resource blocks included in the plurality of resource blocks, a number of resource block groups included in the plurality of resource blocks, a respective number of resource blocks, on each side of a channel frequency associated with a first shared radio frequency spectrum channel of the one or more shared radio frequency spectrum channels, included in the CORESET, or a respective number of resource block groups, on each side of the channel frequency associated with the first shared radio frequency spectrum channel, included in the CORESET.

In an eleventh aspect, alone or in combination with one or more of the first through tenth aspects, a first shared radio frequency spectrum channel of the one or more shared radio frequency spectrum channels shares, with a second shared radio frequency spectrum channel of the one or more shared radio frequency spectrum channels, at least one of a resource block index, a number of resource blocks, or a number of resource block groups. In a twelfth aspect, alone or in combination with one or more of the first through eleventh aspects, the information identifying the CORESET is included in at least one of an RRC communication, a MAC-CE communication, or a DCI communication.

In a thirteenth aspect, alone or in combination with one or more of the first through twelfth aspects, a control channel resource allocation granularity associated with the one or more shared radio frequency spectrum channels is different from a control channel resource allocation granularity associated with a licensed frequency spectrum channel.

In some aspects, an apparatus for wireless communication may include means for receiving, from a BS, information identifying a CORESET for one or more shared radio frequency spectrum channels, wherein the CORESET includes a plurality of resource blocks based at least in part on a resource block granularity associated with the one or more shared radio frequency spectrum channels; and means for communicating with the BS using the CORESET.

In a first aspect, communicating with the BS based at least in part on the CORESET comprises receiving, from the BS, a PDCCH communication based at least in part on monitoring a control region configured by the CORESET. In a second aspect, alone or in combination with the first aspect, the resource block granularity associated with the one or more shared radio frequency spectrum channels is different from a resource block granularity associated with a licensed frequency spectrum channel. In a third aspect, alone or in combination with one or more of the first or second aspects, a location of the CORESET, in a BWP, is indicated relative to a reference frequency associated with the one or more shared radio frequency spectrum channels, and the reference frequency associated with the one or more shared radio frequency spectrum channels is different from a reference frequency associated with a licensed frequency spectrum channel.

In a fourth aspect, alone or in combination with one or more of the first through third aspects, the CORESET includes the plurality of resource blocks based at least in part on at least one of a subcarrier spacing associated with the one or more shared radio frequency spectrum channels or a number of subcarriers included in each resource block of the plurality of resource blocks. In a fifth aspect, alone or in combination with one or more of the first through fourth aspects, the information identifying the CORESET comprises a plurality of bits included in a bitmap, and the plurality of bits indicates the plurality of resource blocks.

In a sixth aspect, alone or in combination with one or more of the first through fifth aspects, a first bit, of the plurality of bits, is associated with a first resource block group that includes a starting resource block of a first shared radio frequency spectrum channel of the one or more shared radio frequency spectrum channels. In a seventh aspect, alone or in combination with one or more of the first through sixth aspects, a second bit, of the plurality of bits, is associated with a second resource block group that includes an ending resource block of the first shared radio frequency spectrum channel. In an eighth aspect, alone or in combination with one or more of the first through seventh aspects, the first bit and the second bit are based at least in part on a third bit associated with a third resource block group that includes a resource block index associated with a BWP in which the CORESET is included.

In a ninth aspect, alone or in combination with one or more of the first through eighth aspects, the first bit and the second bit are based at least in part on at least one of a channel frequency associated with the first shared radio frequency spectrum channel and a channel bandwidth associated with the first shared radio frequency spectrum channel. In a tenth aspect, alone or in combination with one or more of the first through ninth aspects, the plurality of bits included in the bitmap is based at least in part on at least one of the resource block granularity that is used to configure the CORESET, a number of resource blocks included in the plurality of resource blocks, a number of resource block groups included in the plurality of resource blocks, a respective number of resource blocks, on each side of a channel frequency associated with a first shared radio frequency spectrum channel of the one or more shared radio frequency spectrum channels, included in the CORESET, or a respective number of resource block groups, on each side of the channel frequency associated with the first shared radio frequency spectrum channel, included in the CORESET.

In an eleventh aspect, alone or in combination with one or more of the first through tenth aspects, a first shared radio frequency spectrum channel of the one or more shared radio frequency spectrum channels shares, with a second shared radio frequency spectrum channel of the one or more shared radio frequency spectrum channels, at least one of a resource block index, a number of resource blocks, or a number of resource block groups. In a twelfth aspect, alone or in combination with one or more of the first through eleventh aspects, the information identifying the CORESET is included in at least one of an RRC communication, a MAC-CE communication, or a DCI communication.

In a thirteenth aspect, alone or in combination with one or more of the first through twelfth aspects, a control channel resource allocation granularity associated with the one or more shared radio frequency spectrum channels is different from a control channel resource allocation granularity associated with a licensed frequency spectrum channel.

In some aspects, a method of wireless communication, performed by a BS, may include configuring, based at least in part on a resource block granularity associated with one or more shared radio frequency spectrum channels, a CORESET for the one or more shared radio frequency spectrum channels into a plurality of resource blocks; and transmitting, to a UE, information identifying the plurality of resource blocks.

In a first aspect, the method comprises determining a first resource block, of the plurality of resource blocks, at a first edge of a first shared radio frequency channel of the one or more shared radio frequency spectrum channels, determining a second resource block, of the plurality of resource blocks, at a second edge of the first shared radio frequency channel, determining, based at least in part on a resource block index associated with the one or more shared radio frequency spectrum channels, a first offset for the first resource block, determining, based at least in part on the resource block index, a second offset for the second resource block, and selecting a subset of the plurality of bits based at least in part on the first offset and the second offset.

In a second aspect, alone or in combination with the first aspect, determining the first resource block at the first edge of the first shared radio frequency spectrum channel comprises determining a channel frequency resource block associated with a channel frequency of the first shared radio frequency spectrum channel, determining a subset of resource blocks, included in the plurality of resource blocks, on a side of the first channel frequency resource block, determining the first resource block based at least in part on the channel frequency resource block and the subset of resource blocks.

In a third aspect, alone or in combination with one or more of the first or second aspects, determining the second resource block at the second edge of the first shared radio frequency spectrum channel comprises determining a channel frequency resource block associated with a channel frequency of the first shared radio frequency spectrum channel, determining a subset of resource block groups, included in the plurality of resource blocks, on a side of the channel frequency resource block, and determining the second resource block based at least in part on the channel frequency resource block and the subset of resource block groups.

In a fourth aspect, alone or in combination with one or more of the first through third aspects, the method comprises determining a number of resource blocks, included in respective resource block groups of the subset of resource block groups, based at least in part on a subset of resource blocks, included in the plurality of resource blocks, on the side of the first channel frequency resource block and the resource block granularity associated with the one or more shared radio frequency spectrum channels.

In a fifth aspect, alone or in combination with one or more of the first through fourth aspects, a first shared radio frequency spectrum channel of the one or more shared radio frequency spectrum channels shares, with a second shared radio frequency spectrum channel of the one or more shared radio frequency spectrum channel, at least one of a resource block index, a number of resource blocks, or a number of resource block groups. In a sixth aspect, alone or in combination with one or more of the first through fifth aspects, the information identifying the plurality of resource blocks is included in at least one of an RRC communication, a MAC-CE communication, or a DCI communication. In a seventh aspect, alone or in combination with one or more of the first through sixth aspects, the method comprises communicating with the UE using the CORESET. In an eighth aspect, alone or in combination with one or more of the first through seventh aspects, communicating with the UE using the CORESET comprises transmitting, to the UE, a PDCCH communication in a control region configured by the CORESET.

In a ninth aspect, alone or in combination with one or more of the first through eighth aspects, a control channel resource allocation granularity associated with the one or more shared radio frequency spectrum channels is different from a control channel resource allocation granularity associated with a licensed frequency spectrum channel.

In some aspects, a BS for wireless communication may include memory and one or more processors operatively coupled to the memory. The memory and the one or more processors may be configured to configure, based at least in part on a resource block granularity associated with one or more shared radio frequency spectrum channels, a CORESET for the one or more shared radio frequency spectrum channels into a plurality of resource blocks; and transmit, to a UE, information identifying the plurality of resource blocks.

In a first aspect, the one or more processors are further configured to determine a first resource block, of the plurality of resource blocks, at a first edge of a first shared radio frequency channel of the one or more shared radio frequency spectrum channels, determining a second resource block, of the plurality of resource blocks, at a second edge of the first shared radio frequency channel, determine, based at least in part on a resource block index associated with the one or more shared radio frequency spectrum channels, a first offset for the first resource block, determine, based at least in part on the resource block index, a second offset for the second resource block, and select a subset of the plurality of bits based at least in part on the first offset and the second offset.

In a second aspect, alone or in combination with the first aspect, determining the first resource block at the first edge of the first shared radio frequency spectrum channel comprises determining a channel frequency resource block associated with a channel frequency of the first shared radio frequency spectrum channel, determining a subset of resource blocks, included in the plurality of resource blocks, on a side of the first channel frequency resource block, determining the first resource block based at least in part on the channel frequency resource block and the subset of resource blocks.

In a third aspect, alone or in combination with one or more of the first or second aspects, determining the second resource block at the second edge of the first shared radio frequency spectrum channel comprises determining a channel frequency resource block associated with a channel frequency of the first shared radio frequency spectrum channel, determining a subset of resource block groups, included in the plurality of resource blocks, on a side of the channel frequency resource block, and determining the second resource block based at least in part on the channel frequency resource block and the subset of resource block groups.

In a fourth aspect, alone or in combination with one or more of the first through third aspects, the one or more processors are further configured to determine a number of resource blocks, included in respective resource block groups of the subset of resource block groups, based at least in part on a subset of resource blocks, included in the plurality of resource blocks, on the side of the first channel frequency resource block and the resource block granularity associated with the one or more shared radio frequency spectrum channels.

In a fifth aspect, alone or in combination with one or more of the first through fourth aspects, a first shared radio frequency spectrum channel of the one or more shared radio frequency spectrum channels shares, with a second shared radio frequency spectrum channel of the one or more shared radio frequency spectrum channel, at least one of a resource block index, a number of resource blocks, or a number of resource block groups. In a sixth aspect, alone or in combination with one or more of the first through fifth aspects, the information identifying the plurality of resource blocks is included in at least one of an RRC communication, a MAC-CE communication, or a DCI communication. In a seventh aspect, alone or in combination with one or more of the first through sixth aspects, the one or more processors are further configured to communicate with the UE using the CORESET. In an eighth aspect, alone or in combination with one or more of the first through seventh aspects, communicating with the UE using the CORESET comprises transmitting, to the UE, a PDCCH communication in a control region configured by the CORESET.

In a ninth aspect, alone or in combination with one or more of the first through eighth aspects, a control channel resource allocation granularity associated with the one or more shared radio frequency spectrum channels is different from a control channel resource allocation granularity associated with a licensed frequency spectrum channel.

In some aspects, a non-transitory computer-readable medium may store one or more instructions for wireless communication. The one or more instructions, when executed by one or more processors of a BS, may cause the one or more processors to configure, based at least in part on a resource block granularity associated with one or more shared radio frequency spectrum channels, a CORESET for the one or more shared radio frequency spectrum channels into a plurality of resource blocks; and transmit, to a UE, information identifying the plurality of resource blocks.

In a first aspect, the one or more processors, when executed by the one or more processors, further cause the one or more processors to determine a first resource block, of the plurality of resource blocks, at a first edge of a first shared radio frequency channel of the one or more shared radio frequency spectrum channels, determining a second resource block, of the plurality of resource blocks, at a second edge of the first shared radio frequency channel, determine, based at least in part on a resource block index associated with the one or more shared radio frequency spectrum channels, a first offset for the first resource block, determine, based at least in part on the resource block index, a second offset for the second resource block, and select a subset of the plurality of bits based at least in part on the first offset and the second offset.

In a second aspect, alone or in combination with the first aspect, determining the first resource block at the first edge of the first shared radio frequency spectrum channel comprises determining a channel frequency resource block associated with a channel frequency of the first shared radio frequency spectrum channel, determining a subset of resource blocks, included in the plurality of resource blocks, on a side of the first channel frequency resource block, determining the first resource block based at least in part on the channel frequency resource block and the subset of resource blocks.

In a third aspect, alone or in combination with one or more of the first or second aspects, determining the second resource block at the second edge of the first shared radio frequency spectrum channel comprises determining a channel frequency resource block associated with a channel frequency of the first shared radio frequency spectrum channel, determining a subset of resource block groups, included in the plurality of resource blocks, on a side of the channel frequency resource block, and determining the second resource block based at least in part on the channel frequency resource block and the subset of resource block groups.

In a fourth aspect, alone or in combination with one or more of the first through third aspects, the one or more processors, when executed by the one or more processors, further cause the one or more processors to determine a number of resource blocks, included in respective resource block groups of the subset of resource block groups, based at least in part on a subset of resource blocks, included in the plurality of resource blocks, on the side of the first channel frequency resource block and the resource block granularity associated with the one or more shared radio frequency spectrum channels.

In a fifth aspect, alone or in combination with one or more of the first through fourth aspects, a first shared radio frequency spectrum channel of the one or more shared radio frequency spectrum channels shares, with a second shared radio frequency spectrum channel of the one or more shared radio frequency spectrum channel, at least one of a resource block index, a number of resource blocks, or a number of resource block groups. In a sixth aspect, alone or in combination with one or more of the first through fifth aspects, the information identifying the plurality of resource blocks is included in at least one of an RRC communication, a MAC-CE communication, or a DCI communication. In a seventh aspect, alone or in combination with one or more of the first through sixth aspects, the one or more processors, when executed by the one or more processors, further cause the one or more processors to communicate with the UE using the CORESET. In an eighth aspect, alone or in combination with one or more of the first through seventh aspects, communicating with the UE using the CORESET comprises transmitting, to the UE, a PDCCH communication in a control region configured by the CORESET.

In a ninth aspect, alone or in combination with one or more of the first through eighth aspects, a control channel resource allocation granularity associated with the one or more shared radio frequency spectrum channels is different from a control channel resource allocation granularity associated with a licensed frequency spectrum channel.

In some aspects, an apparatus for wireless communication may include means for configuring, based at least in part on a resource block granularity associated with one or more shared radio frequency spectrum channels, a CORESET for the one or more shared radio frequency spectrum channels into a plurality of resource blocks; and means for transmitting, to a UE, information identifying the plurality of resource blocks.

In a first aspect, the apparatus comprises means for determining a first resource block, of the plurality of resource blocks, at a first edge of a first shared radio frequency channel of the one or more shared radio frequency spectrum channels, determining a second resource block, of the plurality of resource blocks, at a second edge of the first shared radio frequency channel, means for determining, based at least in part on a resource block index associated with the one or more shared radio frequency spectrum channels, a first offset for the first resource block, means for determining, based at least in part on the resource block index, a second offset for the second resource block, and means for selecting a subset of the plurality of bits based at least in part on the first offset and the second offset.

In a second aspect, alone or in combination with the first aspect, determining the first resource block at the first edge of the first shared radio frequency spectrum channel comprises determining a channel frequency resource block associated with a channel frequency of the first shared radio frequency spectrum channel, determining a subset of resource blocks, included in the plurality of resource blocks, on a side of the first channel frequency resource block, determining the first resource block based at least in part on the channel frequency resource block and the subset of resource blocks.

In a third aspect, alone or in combination with one or more of the first or second aspects, determining the second resource block at the second edge of the first shared radio frequency spectrum channel comprises determining a channel frequency resource block associated with a channel frequency of the first shared radio frequency spectrum channel, determining a subset of resource block groups, included in the plurality of resource blocks, on a side of the channel frequency resource block, and determining the second resource block based at least in part on the channel frequency resource block and the subset of resource block groups.

In a fourth aspect, alone or in combination with one or more of the first through third aspects, the apparatus comprises means for determining a number of resource blocks, included in respective resource block groups of the subset of resource block groups, based at least in part on a subset of resource blocks, included in the plurality of resource blocks, on the side of the first channel frequency resource block and the resource block granularity associated with the one or more shared radio frequency spectrum channels.

In a fifth aspect, alone or in combination with one or more of the first through fourth aspects, a first shared radio frequency spectrum channel of the one or more shared radio frequency spectrum channels shares, with a second shared radio frequency spectrum channel of the one or more shared radio frequency spectrum channel, at least one of a resource block index, a number of resource blocks, or a number of resource block groups. In a sixth aspect, alone or in combination with one or more of the first through fifth aspects, the information identifying the plurality of resource blocks is included in at least one of an RRC communication, a MAC-CE communication, or a DCI communication. In a seventh aspect, alone or in combination with one or more of the first through sixth aspects, the apparatus comprises means for communicating with the UE using the CORESET. In an eighth aspect, alone or in combination with one or more of the first through seventh aspects, communicating with the UE using the CORESET comprises transmitting, to the UE, a PDCCH communication in a control region configured by the CORESET.

In a ninth aspect, alone or in combination with one or more of the first through eighth aspects, a control channel resource allocation granularity associated with the one or more shared radio frequency spectrum channels is different from a control channel resource allocation granularity associated with a licensed frequency spectrum channel.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
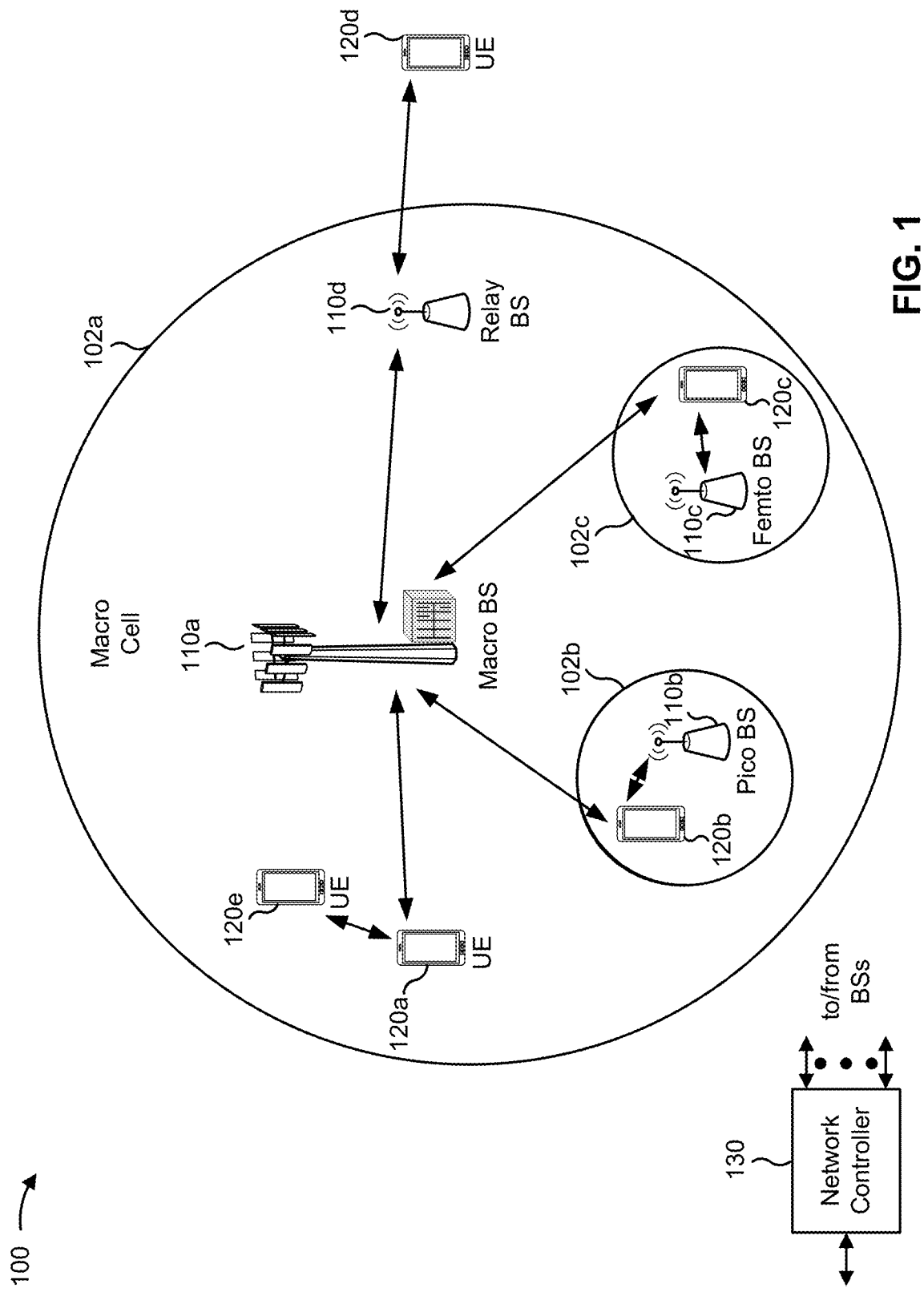
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
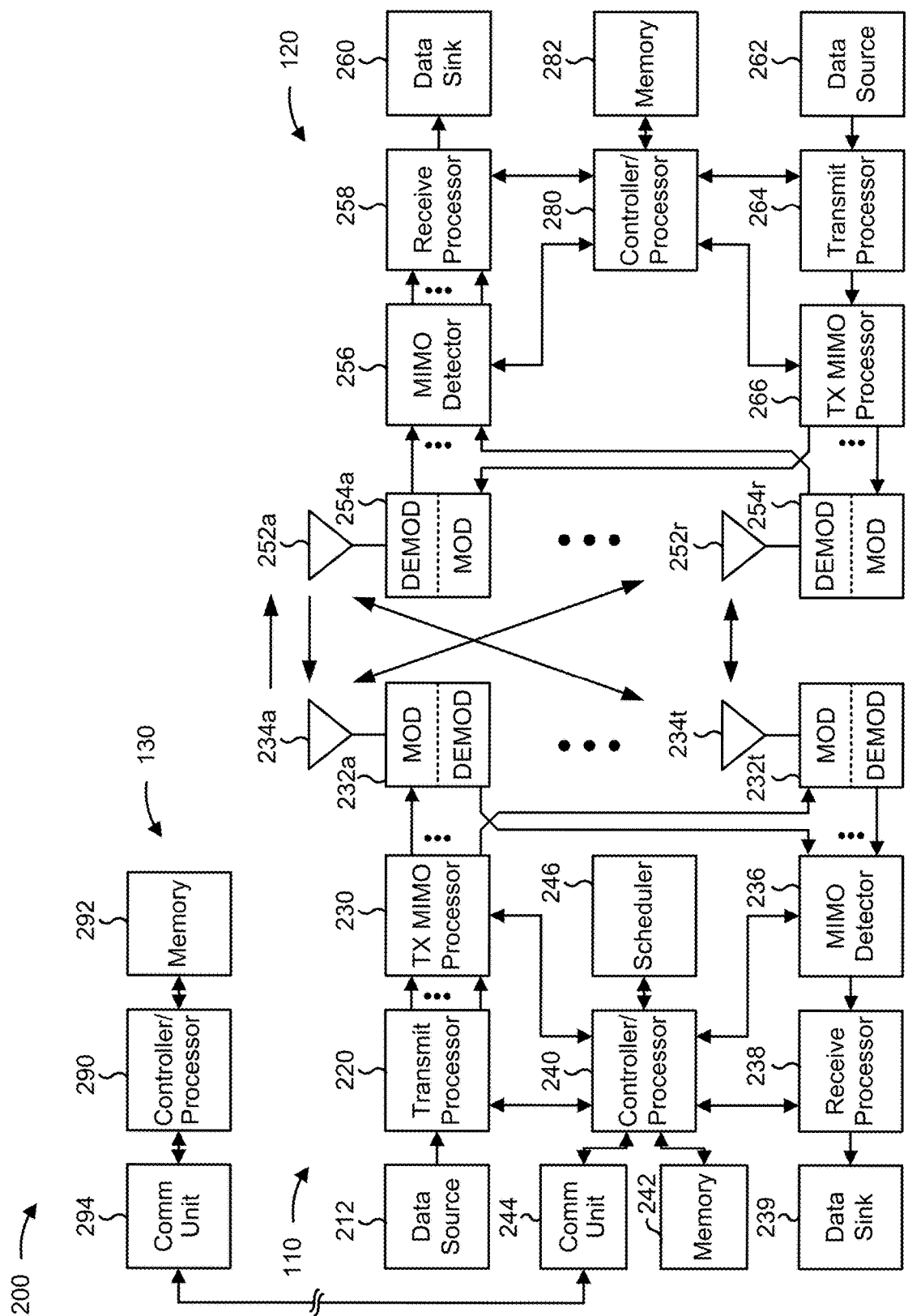
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with shared radio frequency spectrum channel configuration, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving, from a base station, information identifying a CORESET for one or more shared radio frequency spectrum channels, wherein the CORESET includes a plurality of resource blocks based at least in part on a resource block granularity associated with the one or more shared radio frequency spectrum channels, means for communicating with the base station using the CORESET, and/or the like. In some aspects, such means may include one or more components of UE 120 described in connection with FIG. 2.

In some aspects, base station 110 may include means for configuring, based at least in part on a resource block granularity associated with one or more shared radio frequency spectrum channels, a CORESET for the one or more shared radio frequency spectrum channels into a plurality of resource blocks, means for transmitting, to a UE, information identifying the plurality of resource blocks, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
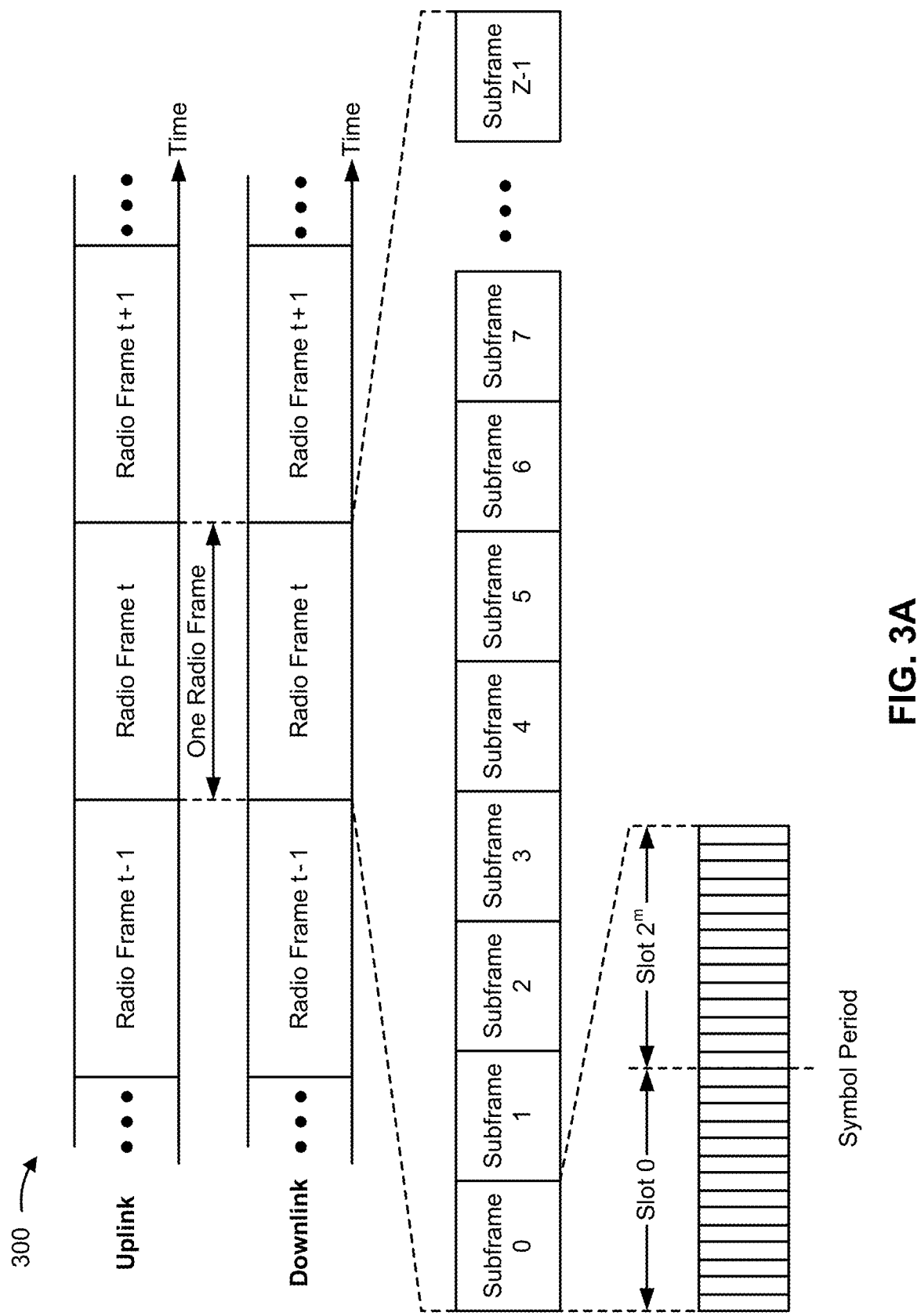
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
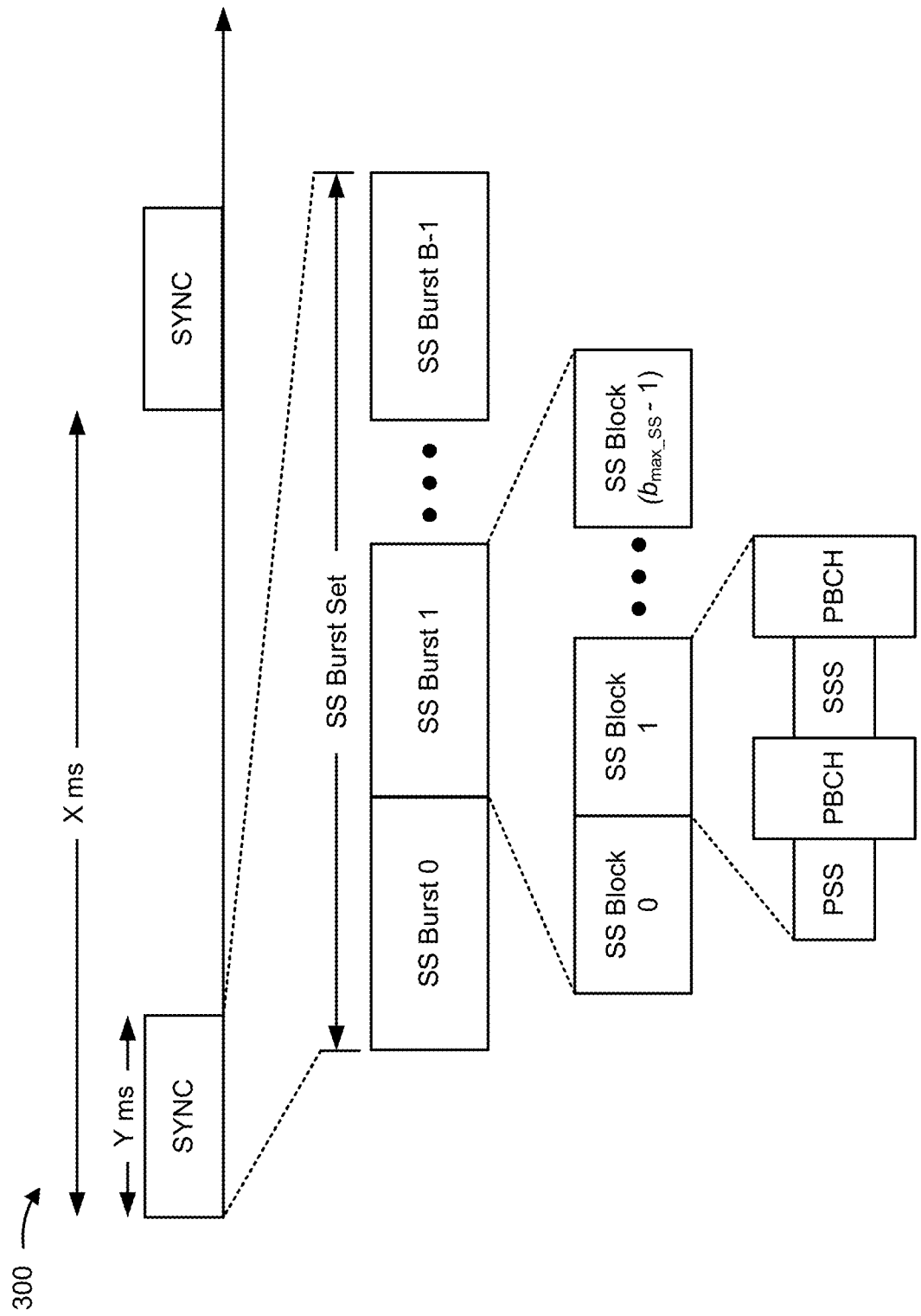
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
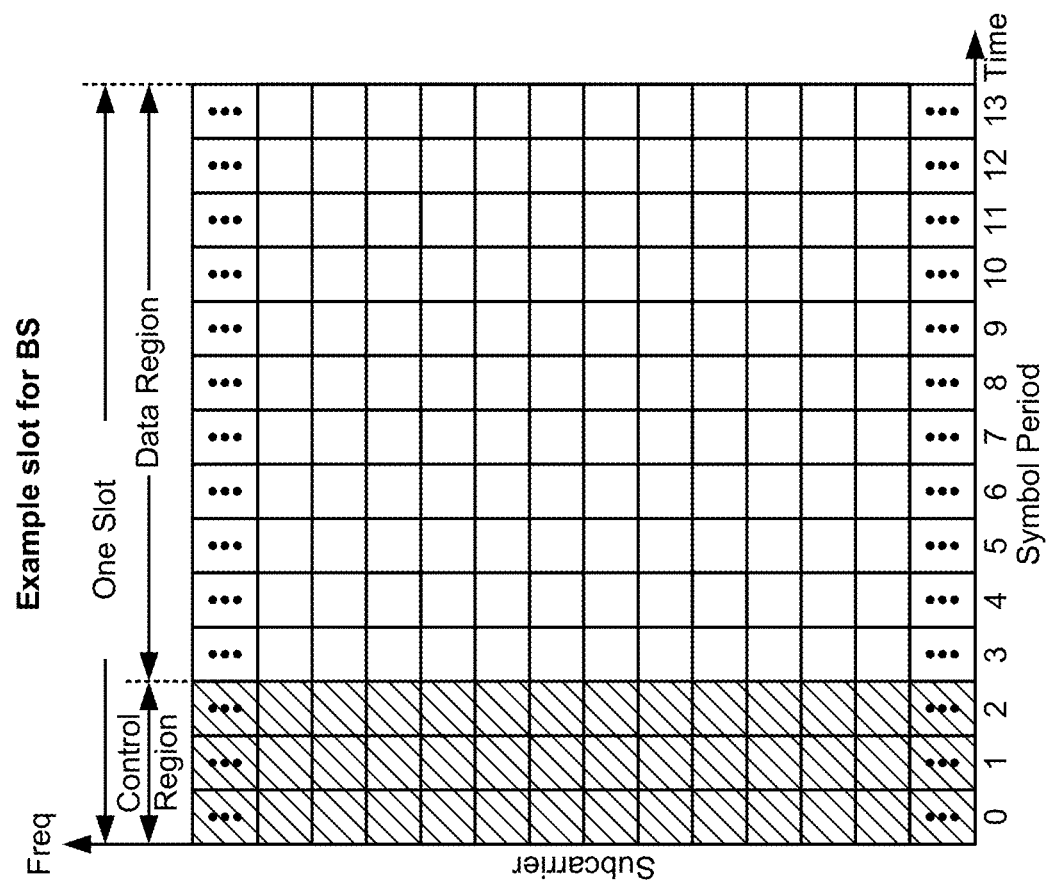
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

In a wireless network, a UE may communicate with a BS using various types of radio frequency spectrums. In some cases, the UE and BS may communicate using a licensed radio frequency spectrum, which may include a radio frequency spectrum that may be licensed to a wireless network operator for use in cellular communications. The licensed radio frequency spectrum may be configured into a plurality of channels having respective channel frequencies and respective channel bandwidths.

A licensed radio frequency spectrum channel may further be configured into a plurality of resource blocks, which may be used for uplink communications and/or downlink communications. The BS may configure the UE to monitor a control region that includes one or more resource blocks, of the plurality of resource blocks, for downlink communications (e.g., PDCCH communications) by transmitting, to the UE, information identifying a control resource set (CORESET). The CORESET may indicate, to the UE, the one or more resource blocks. In some cases, the information identifying the CORESET may include a bitmap. Each bit, included in the bitmap, may correspond to a group of contiguous resource blocks included in the licensed radio frequency spectrum channel, and each bit may indicate (e.g., by a 1 value or a 0 value) whether the corresponding group of resource blocks are allocated to the CORESET. The number of resource blocks that are included in a group of resource blocks may be referred to as a resource block granularity. As an example, a resource block granularity associated with a licensed radio frequency spectrum channel may be six resource blocks per bit.

In some cases, the UE and the BS may communicate using a shared radio frequency spectrum, which may include a radio frequency spectrum that is unlicensed and/or shared for various types of uses. Examples of shared radio frequency spectrums may include industrial, scientific, and medical (ISM) radio frequency bands, such as 2.4 GHz and 5 GHz (which may typically be used for Wi-Fi communication), and/or the like. In some cases, the BS and the UE may reuse the channel structure of a shared radio frequency spectrum that is configured for other types of communication. For example, if the BS and the UE communicate via 5 GHz, the BS and the UE may reuse the channel frequencies and channel bandwidths that are configured for Wi-Fi communication. An example channel bandwidth of a shared radio frequency spectrum channel may be 20 MHz.

To permit cellular communication using the channel structure of the shared radio frequency spectrum, the shared radio frequency spectrum channels may be configured into respective pluralities of resource blocks. A shared radio frequency spectrum channel may further be configured into a plurality of resource blocks, which may be used for uplink communications and/or downlink communications. The BS may configure the UE to monitor a control region that includes one or more resource blocks, of the plurality of resource blocks, for downlink communications (e.g., PDCCH communications) by transmitting, to the UE, information identifying a CORESET. As indicated above, the information identifying the CORESET may include a bitmap. In some cases, the resource block granularity, associated with a licensed radio frequency spectrum channel, may be too course for use with shared radio frequency spectrum channels. For example, a six resource block granularity for a shared radio frequency spectrum channel having a 20 MHz channel bandwidth and a 30 KHz subcarrier spacing may result in unused resource blocks (i.e., resource blocks that are not associated with a bit in the bitmap) at each end of the shared radio frequency spectrum channel.

Some aspects, described herein, provide techniques and apparatuses for shared radio frequency spectrum channel configuration. In some aspects, a BS may configure a CORESET for one or more shared radio frequency spectrum channels. The BS may configure the CORESET by selecting a plurality of resource blocks that are to be included in the CORESET, and may indicate, to the UE, the plurality of resource blocks in a bitmap that identifies the plurality of resource blocks. The plurality of resource blocks may be indicated by the bitmap based at least in part on a resource block granularity associated with the one or more shared radio frequency spectrum channels. That is, the number of resource blocks that correspond to a bit in the bitmap may be configured, based at least in part on the one or more shared radio frequency spectrum channels, to reduce the number of unused resource blocks at each end of the one or more shared radio frequency spectrum channels. In this way, the resource block granularity associated with the one or more shared radio frequency spectrum channels may permit a more efficient utilization of the resource blocks included in the one or more shared radio frequency spectrum channels relative to a resource block granularity associated with a licensed radio frequency spectrum channel.

Figure 5:
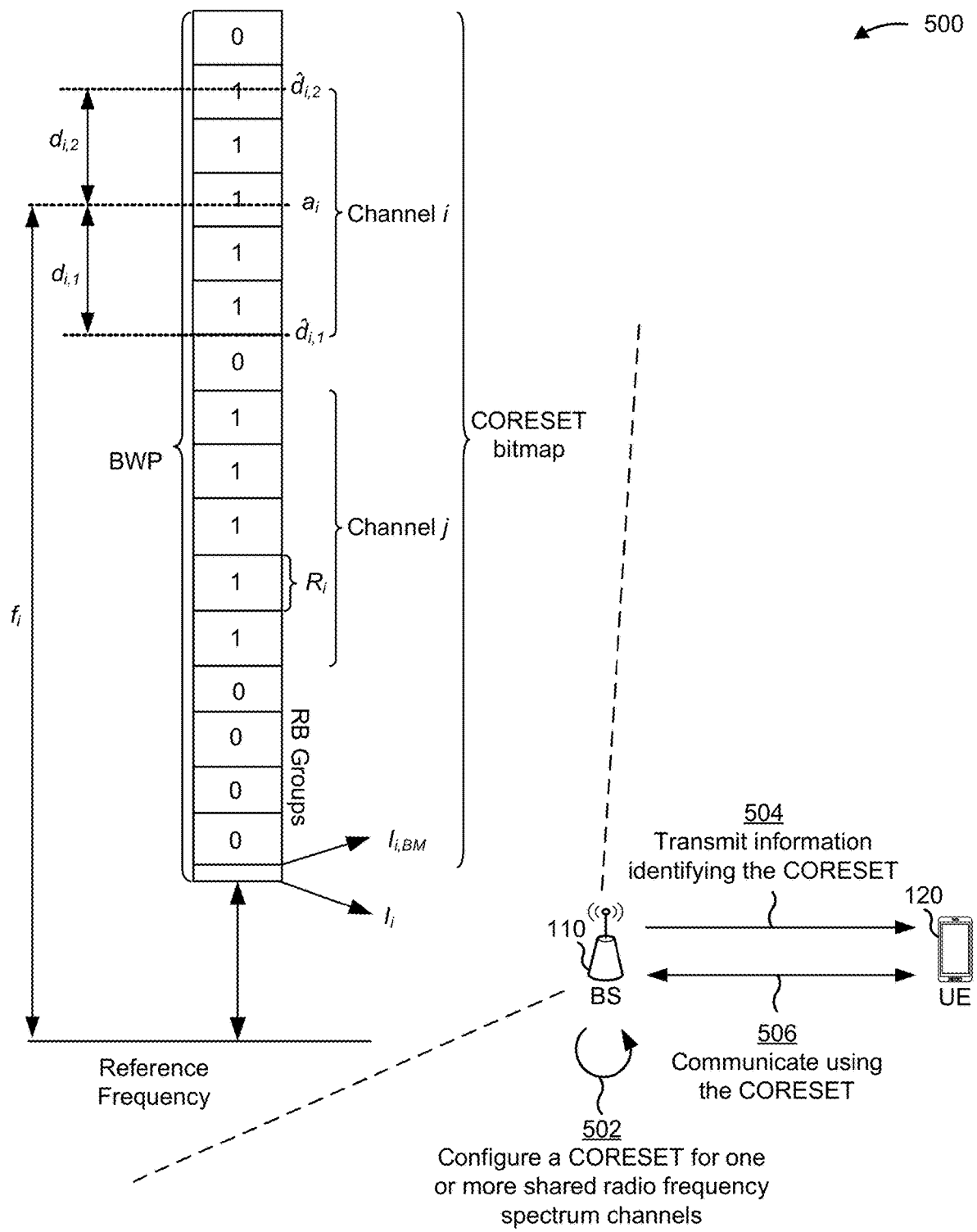
FIG. 5 is a diagram illustrating an example of shared radio frequency spectrum channel configuration, in accordance with various aspects of the present disclosure.

FIG. 5 is a diagram illustrating an example 500 of shared radio frequency spectrum channel configuration, in accordance with various aspects of the present disclosure. As shown in FIG. 5, example 500 may include a user equipment (e.g., UE 120) and a base station (e.g., BS 110). In some aspects, BS 110 and UE 120 may be included in a wireless network (e.g., wireless network 100). In some aspects, BS 110 and UE 120 may communicate using various radio frequency spectrums, such as a licensed radio frequency spectrum, a shared radio frequency spectrum, and/or the like.

In some aspects, when BS 110 and UE 120 communicate using a shared radio frequency spectrum, BS 110 may transmit a PDCCH communication to UE 120 in a downlink bandwidth part (BWP) that includes one or more shared radio frequency spectrum channels (e.g., Channel i, Channel j, and/or the like). As shown in FIG. 5, and by reference number 502, BS 110 may configure a CORESET, for the one or more shared radio frequency spectrum channels, to configure UE 120 to monitor a control region that includes a plurality of resource blocks to receive the PDCCH communication. The CORESET may comprise the entire downlink BWP or a portion of the downlink BWP.

In some aspects, to configure the CORESET, BS 110 may configure the CORESET into the plurality of resource blocks based at least in part on a resource block granularity ($R_i$) associated with the one or more shared radio frequency spectrum channels. As indicated above, the resource block granularity associated with the one or more shared radio frequency spectrum channels may be different from a resource block granularity associated with a licensed radio frequency spectrum channel in order to increase the resource block utilization of the one or more shared radio frequency spectrum channels. In some aspects, a resource block granularity associated with a shared radio frequency spectrum channel (e.g., Channel i) may be the same as the resource block granularity associated with another shared radio frequency spectrum channel (e.g., Channel j). In some aspects, the resource block granularity associated with a shared radio frequency spectrum channel may be different from the resource block granularity associated with another shared radio frequency spectrum channel.

As shown in FIG. 5, BS 110 may configure the CORESET into the plurality of resource blocks based at least in part on the resource block granularity associated with the one or more shared radio frequency spectrum channel by determining a frequency offset ($f_i$), associated with a shared radio frequency spectrum channel (e.g., Channel i), to a channel frequency associated with the shared radio frequency spectrum channel. The reference frequency may be the lowest frequency, the highest frequency, or another frequency included in the shared radio frequency spectrum channel. For example, if the reference frequency is 2.400 GHz and the channel frequency of the shared radio frequency spectrum channel is 2.422 GHz (e.g., Wi-Fi Channel 3), then BS 110 may determine the frequency offset to be 22 MHz. In some aspects, the reference frequency associated with the shared radio frequency spectrum channel may be different from a reference frequency associated with a licensed frequency spectrum channel.

BS 110 may use the frequency offset to determine a channel frequency resource block ($a_i$) of the shared radio frequency spectrum channel, which may include a resource block located at the channel frequency of the shared radio frequency spectrum channel. The channel frequency resource block may correspond to a channel frequency resource block of the shared radio frequency spectrum channel or another resource block included in the shared radio frequency spectrum channel (e.g., Channel j). For example, BS 110 may determine the channel frequency resource block based at least in part on Equation 1:

$$a_i = f_i/(K \times \Delta f \times R_i) \quad \text{Equation 1}$$

where K is the number of subcarriers included in a resource block in the shared radio frequency spectrum channel and $\Delta f$ is the subcarrier spacing of the subcarriers. The result of Equation 1 may be converted to an integer using various formulas, functions, algorithms, and/or operations (e.g., a floor function, a ceiling function, a rounding function, and/or the like) to obtain the channel frequency resource block. BS 110 may use the channel frequency resource block to determine a number of resource blocks that are to be included in the CORESET on each side of the channel frequency resource block (e.g., $N_{i,1}$ for a first side of the channel frequency resource block and $N_{i,2}$ for a second side of the channel frequency resource block). In some aspects, the number of resource blocks that are to be included in the CORESET for the shared radio frequency spectrum channel may be the same as the number of resource blocks that are to be included in a CORESET for another shared radio frequency spectrum channel (e.g., Channel j). In some aspects, the number of resource blocks that are to be included in the CORESET for the shared radio frequency spectrum channel may be different from the number of resource blocks that are to be included in a CORESET for another shared radio frequency spectrum channel (e.g., Channel j).

BS 110 may use the resource block granularity associated with the one or more shared radio frequency spectrum channels to determine the number of resource block groups that are to be included in the CORESET on each side of the channel frequency resource block based at least in part on Equation 2 and Equation 3:

$$M_{i,1} = \lceil N_{i,1}/R_i \rceil \quad \text{Equation 2}$$

$$M_{i,2} = \lceil N_{i,2}/R_i \rceil \quad \text{Equation 3}$$

In some aspects, a resource block group may include a number of resource blocks that is determined based at least in part on the resource block granularity associated with the one or more shared radio frequency spectrum channels. In some aspects, the number of resource block groups that are to be included in the CORESET for the shared radio frequency spectrum channel may be the same as the number of resource block groups that are to be included in a CORESET for another shared radio frequency spectrum channel (e.g., Channel j). In some aspects, the number of resource block groups that are to be included in the CORESET for the shared radio frequency spectrum channel may be different from the number of resource block groups that are to be included in a CORESET for another shared radio frequency spectrum channel (e.g., Channel j).

Once the number of resource block groups that are to be included in the CORESET on each side of the channel frequency resource block has been determined, BS 110 may determine a distance, in resource blocks and/or resource block groups, to each edge of the shared radio frequency spectrum channel based at least in part on Equation 4 and Equation 5:

$$d_{i,1} = a_i - M_{i,1} \quad \text{Equation 4}$$

$$d_{i,2} = a_i + M_{i,2} \quad \text{Equation 5}$$

For example, $d_{i,1}$ may correspond to a distance (e.g., in resource blocks, in resource block groups, and/or the like) between a resource block (or resource block group) located at a first edge of the shared radio frequency spectrum channel and the channel frequency resource block of the shared radio frequency spectrum channel. As another example, $d_{i,2}$ may correspond to a distance (e.g., in resource blocks, in resource block groups, and/or the like) between a resource block (or resource block group) located at a second edge of the shared radio frequency spectrum channel and the channel frequency resource block of the shared radio frequency spectrum channel.

Once BS 110 has determined the structure of the shared radio frequency spectrum channel in the CORESET according to Equations 1-6, BS 110 may determine a location of the shared radio frequency spectrum channel in the CORESET. BS 110 may determine the location of the shared radio frequency spectrum channel in the CORESET based at least in part on a resource block index ($I_i$) associated with the downlink BWP. The resource block index may include a resource block at which the downlink BWP starts in the frequency domain and may be determined relative to the reference frequency associated with the one or more shared radio frequency spectrum channels. In some aspects, the same resource block index may be used for the shared radio frequency spectrum channel and for another shared radio frequency spectrum channel (e.g., Channel j). In some aspects, different resource block indices may be used for the shared radio frequency spectrum channel and for another shared radio frequency spectrum channel (e.g., Channel j).

To determine the location of the shared radio frequency spectrum channel in the CORESET based at least in part on a resource block index associated with the downlink BWP, BS 110 may configure or quantize the resource block index for a bitmap associated with the downlink BWP based at least in part on to Equation 6:

$$I_{i,BM} = \lceil I_i/R_i \rceil \quad \text{Equation 6}$$

where $I_{i,BM}$ is the configured or quantized resource block index associated with the downlink BWP. The configured or quantized resource block index may correspond to the first resource block of the first resource block group indicated in the bitmap, which may correspond to the first bit included in the bitmap.

BS 110 may then determine respective locations (e.g., $\hat{d}_{i,1}$ and $\hat{d}_{i,2}$), in the bitmap, of the edges of the shared radio frequency spectrum channel in the CORESET based at least in part on the configured or quantized resource block index associated with the downlink BWP. For example, BS 110 may determine the respective locations of the edges of the shared radio frequency spectrum channel in the CORESET based at least in part on Equation 7 and Equation 8:

$$\hat{d}_{i,1} = d_{i,1} - I_{i,BM} \quad \text{Equation 7}$$

$$\hat{d}_{i,2} = d_{i,2} - I_{i,BM} \quad \text{Equation 8}$$

The respective locations of the edges of the shared radio frequency spectrum channel in the CORESET may correspond to respective resource blocks (and thus respective resource block groups) in the CORESET. For example, a location of a first edge of the shared radio frequency spectrum channel may correspond to a first resource block included in a first resource block group of the CORESET, and a location of a second edge of the shared radio frequency spectrum channel in the may correspond to a second resource block included in a second resource block group of the CORESET. In this case, $\hat{d}_{i,1}$ and $\hat{d}_{i,2}$ may function as respective offsets for the edges of the shared radio frequency spectrum channel in the CORESET based at least in part on the configured or quantized resource block index associated with the downlink BWP.

BS 110 may generate the bitmap based at least in part on the respective locations of the edges of the one or more shared radio frequency spectrum channels in the CORESET. The first bit, included in the bitmap, may correspond to the resource block group that includes the configured or quantized resource block index associated with the downlink BWP. BS 110 may set the values of the respective bits corresponding to the resource block groups from the resource block group that includes the configured or quantized resource block index associated with the downlink BWP, to the resource block group adjacent to the resource block group that includes the location of the first edge of the first shared radio frequency spectrum channel in the in the CORESET (e.g., Channel j), to a value (e.g., a 0 value) that indicates the corresponding resource block groups are not included in the CORESET. BS 110 may set the values of the respective bits corresponding to the resource block groups from the resource block group that includes the location of the first edge of the first shared radio frequency spectrum channel, to the resource block group that includes the location of the second edge of the first shared radio frequency spectrum channel, to a value (e.g., a 1 value) that indicates the corresponding resource block groups are included in the CORESET. BS 110 may set the values of the respective bits corresponding to the resource block groups from the resource block group adjacent to the resource block group that includes the location of the second edge of the shared radio frequency spectrum channel, to the next shared radio frequency spectrum channel in the CORESET (e.g., Channel i), to a value (e.g., a 0 value) that indicates the corresponding resource block groups are not included in the CORESET. BS 110 may continue the above-described operations for the other shared radio frequency spectrum channel in the CORESET.

As further shown in FIG. 5, and by reference number 504, BS 110 may transmit information identifying the CORESET for the one or more shared radio frequency spectrum channels. That is, BS 110 may transmit information identifying the plurality of resource blocks included in the CORESET for the one or more shared radio frequency spectrum channels. In some aspects, the information identifying the CORESET may include the bitmap that was generated by BS 110.

In some aspects, BS 110 may transmit the information in a signaling communication, such as a radio resource control (RRC) communication, a medium access control control element (MAC-CE) communication, a downlink control information (DCI) communication, and/or another type of signaling communication.

UE 120 may receive the signaling communication and may identify the information identifying the CORESET included in the signaling communication. UE 120 may use the information identifying the CORESET to identify the plurality of resource blocks that are included in the CORESET. For example, UE 120 may determine the respective values of the bits included in the bitmap to determine which resource block groups (and thus, which resource blocks) are included in the CORESET. As an example, UE 120 may determine that bits having a 1 value indicate that the corresponding resource block groups are included in the CORESET, and may determine that bits have a 0 value indicate that the corresponding resource block groups are not included in the CORESET.

As further shown in FIG. 5, and by reference number 506, BS 110 and UE 120 may communicate based at least in part on the plurality of resource blocks included in the CORESET. For example, UE 120 may monitor a control region that includes the plurality of resource blocks for PDCCH communications transmitted from BS 110, and BS 110 may transmit, to UE 120, PDCCH communications in the plurality of resource blocks.

In this way, BS 110 may configure a CORESET by selecting a plurality of resource blocks that are to be included in the CORESET for a one or more shared radio frequency spectrum channels, and may indicate, to UE 120, the plurality of resource blocks in a bitmap that identifies the plurality of resource blocks. The plurality of resource blocks may be indicated by the bitmap based at least in part on a resource block granularity associated with the one or more shared radio frequency spectrum channels. That is, the number of resource blocks that correspond to a bit in the bitmap may be configured, based at least in part on the one or more shared radio frequency spectrum channels, to reduce the number of unused resource blocks at each end of the one or more shared radio frequency spectrum channels. In this way, the resource block granularity associated with the one or more shared radio frequency spectrum channels may permit a more efficient utilization of the resource blocks included in the one or more shared radio frequency spectrum channels relative to a resource block granularity associated with a licensed radio frequency spectrum channel.

As indicated above, FIG. 5 is provided as an example. Other examples may differ from what is described with regard to FIG. 5.

Figure 6:
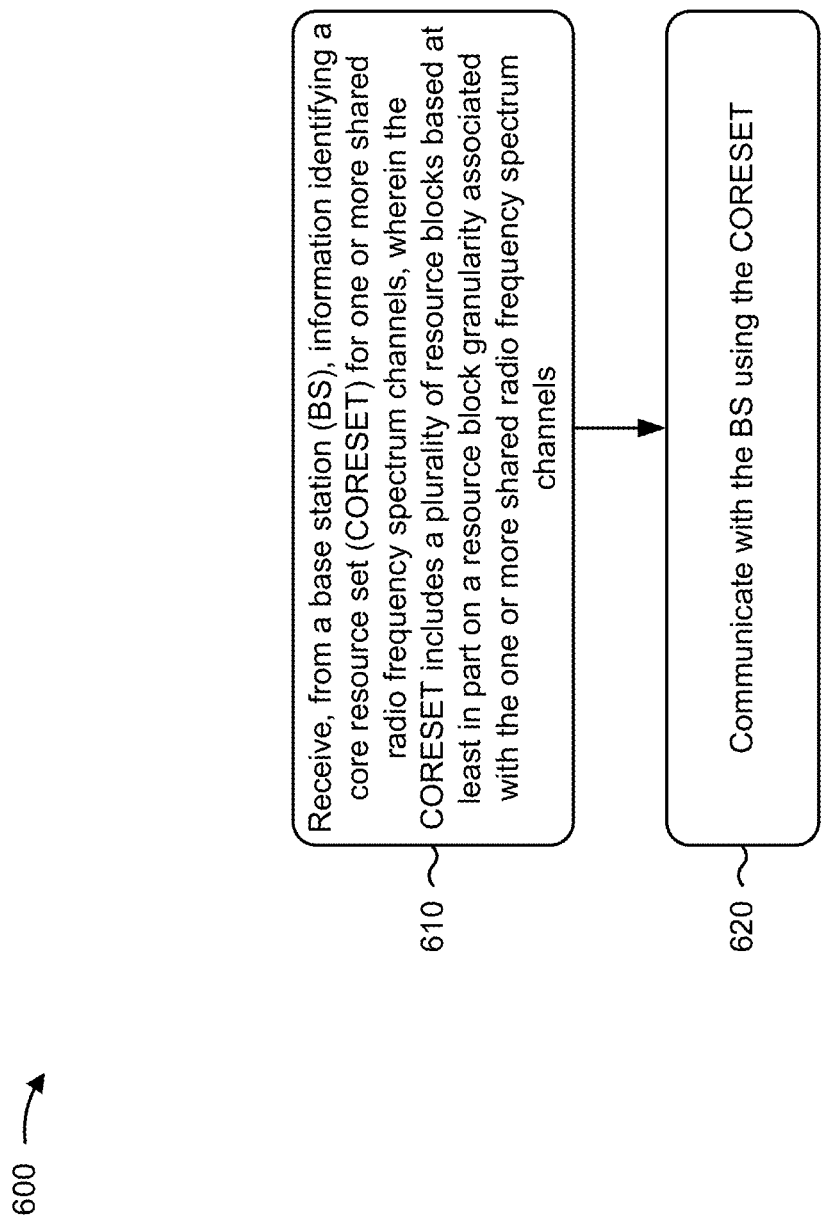
FIG. 6 is a diagram illustrating an example process performed, for example, by a user equipment (UE), in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with shared radio frequency spectrum channel configuration.

As shown in FIG. 6, in some aspects, process 600 may include receiving, from a BS, information identifying a CORESET for one or more shared radio frequency spectrum channels, wherein the CORESET includes a plurality of resource blocks based at least in part on a resource block granularity associated with the one or more shared radio frequency spectrum channels (block 610). For example, the UE (e.g., using receive processor 258, transmit processor 264, controller/processor 280, memory 282, and/or the like) may receive, from a BS, information identifying a CORESET for one or more shared radio frequency spectrum channels, as described above. In some aspects, the CORESET includes a plurality of resource blocks based at least in part on a resource block granularity associated with the one or more shared radio frequency spectrum channels.

As further shown in FIG. 6, in some aspects, process 600 may include communicating with the BS using the CORESET (block 620). For example, the UE (e.g., using receive processor 258, transmit processor 264, controller/processor 280, memory 282, and/or the like) may communicate with the BS using the CORESET, as described above.

Process 600 may include additional aspects, such as any single implementation or any combination of aspects described below and/or in connection with one or more other processes described elsewhere herein.

In a first aspect, communicating with the BS based at least in part on the CORESET comprises receiving, from the BS, a PDCCH communication based at least in part on monitoring a control region configured by the CORESET. In a second aspect, alone or in combination with the first aspect, the resource block granularity associated with the one or more shared radio frequency spectrum channels is different from a resource block granularity associated with a licensed frequency spectrum channel. In a third aspect, alone or in combination with one or more of the first or second aspects, a location of the CORESET, in a BWP, is indicated relative to a reference frequency associated with the one or more shared radio frequency spectrum channels, and the reference frequency associated with the one or more shared radio frequency spectrum channels is different from a reference frequency associated with a licensed frequency spectrum channel.

In a fourth aspect, alone or in combination with one or more of the first through third aspects, the CORESET includes the plurality of resource blocks based at least in part on at least one of a subcarrier spacing associated with the one or more shared radio frequency spectrum channels or a number of subcarriers included in each resource block of the plurality of resource blocks. In a fifth aspect, alone or in combination with one or more of the first through fourth aspects, the information identifying the CORESET comprises a plurality of bits included in a bitmap, and the plurality of bits indicates the plurality of resource blocks.

In a sixth aspect, alone or in combination with one or more of the first through fifth aspects, a first bit, of the plurality of bits, is associated with a first resource block group that includes a starting resource block of a first shared radio frequency spectrum channel of the one or more shared radio frequency spectrum channels. In a seventh aspect, alone or in combination with one or more of the first through sixth aspects, a second bit, of the plurality of bits, is associated with a second resource block group that includes an ending resource block of the first shared radio frequency spectrum channel. In an eighth aspect, alone or in combination with one or more of the first through seventh aspects, the first bit and the second bit are based at least in part on a third bit associated with a third resource block group that includes a resource block index associated with a BWP in which the CORESET is included.

In a ninth aspect, alone or in combination with one or more of the first through eighth aspects, the first bit and the second bit are based at least in part on at least one of a channel frequency associated with the first shared radio frequency spectrum channel and a channel bandwidth associated with the first shared radio frequency spectrum channel. In a tenth aspect, alone or in combination with one or more of the first through ninth aspects, the plurality of bits included in the bitmap is based at least in part on at least one of the resource block granularity that is used to configure the CORESET, a number of resource blocks included in the plurality of resource blocks, a number of resource block groups included in the plurality of resource blocks, a respective number of resource blocks, on each side of a channel frequency associated with a first shared radio frequency spectrum channel of the one or more shared radio frequency spectrum channels, included in the CORESET, or a respective number of resource block groups, on each side of the channel frequency associated with the first shared radio frequency spectrum channel, included in the CORESET.

In an eleventh aspect, alone or in combination with one or more of the first through tenth aspects, a first shared radio frequency spectrum channel of the one or more shared radio frequency spectrum channels shares, with a second shared radio frequency spectrum channel of the one or more shared radio frequency spectrum channels, at least one of a resource block index, a number of resource blocks, or a number of resource block groups. In a twelfth aspect, alone or in combination with one or more of the first through eleventh aspects, the information identifying the CORESET is included in at least one of an RRC communication, a MAC-CE communication, or a DCI communication.

In a thirteenth aspect, alone or in combination with one or more of the first through twelfth aspects, a control channel resource allocation granularity associated with the one or more shared radio frequency spectrum channels is different from a control channel resource allocation granularity associated with a licensed frequency spectrum channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
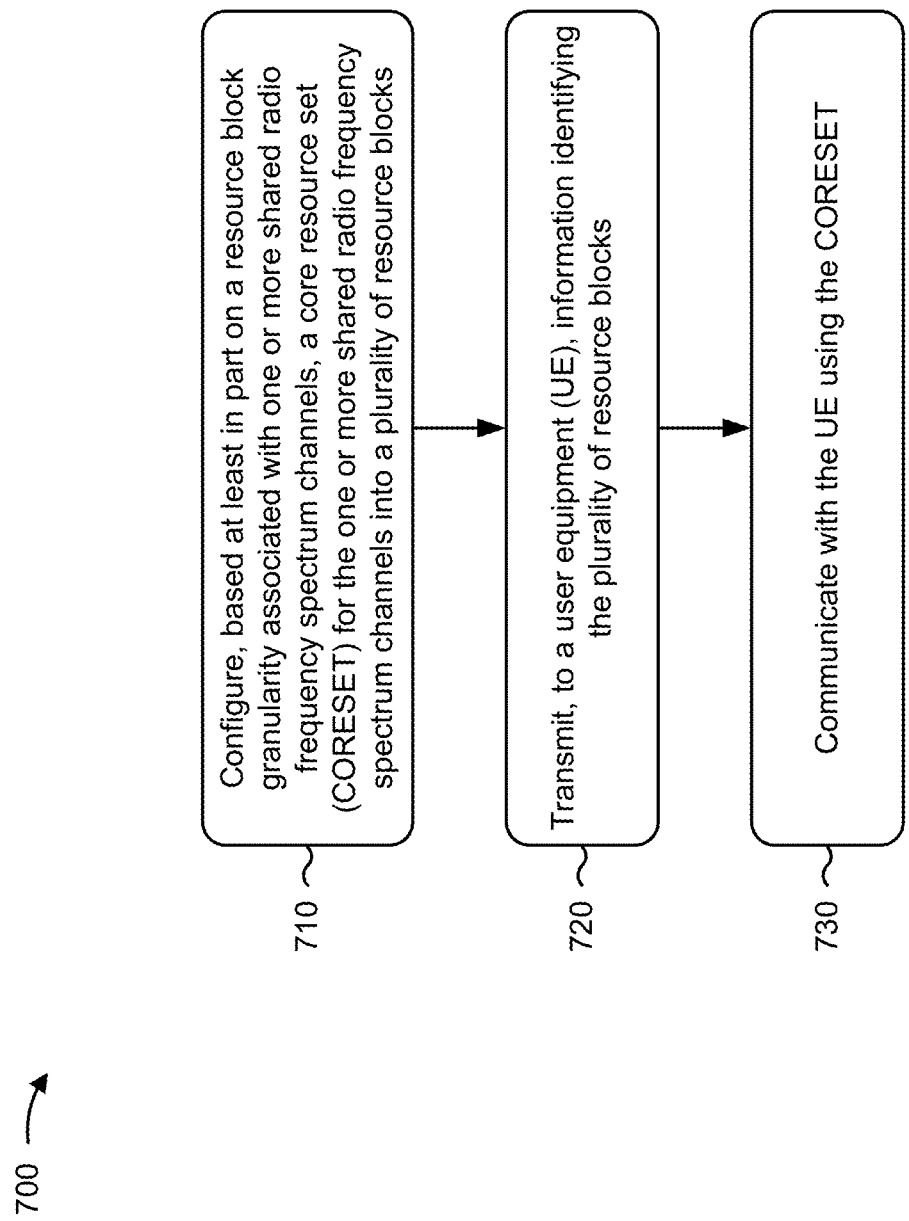
FIG. 7 is a diagram illustrating an example process performed, for example, by a base station (BS), in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with shared radio frequency spectrum channel configuration.

As shown in FIG. 7, in some aspects, process 700 may include configuring, based at least in part on a resource block granularity associated with one or more shared radio frequency spectrum channels, a CORESET for the one or more shared radio frequency spectrum channels into a plurality of resource blocks (block 710). For example, the BS (e.g., using transmit processor 220, receive processor 238, controller/processor 240, memory 242, and/or the like) may configure, based at least in part on a resource block granularity associated with one or more shared radio frequency spectrum channels, a CORESET for the one or more shared radio frequency spectrum channels into a plurality of resource blocks, as described above.

As further shown in FIG. 7, in some aspects, process 700 may include transmitting, to a UE, information identifying the plurality of resource blocks (block 720). For example, the BS (e.g., using transmit processor 220, receive processor 238, controller/processor 240, memory 242, and/or the like) may transmit, to a UE, information identifying the plurality of resource blocks, as described above.

As further shown in FIG. 7, in some aspects, process 700 may include communicating with the UE using the CORESET (block 730). For example, the BS (e.g., using transmit processor 220, receive processor 238, controller/processor 240, memory 242, and/or the like) may communicate with the UE using the CORESET, as described above.

Process 700 may include additional aspects, such as any single implementation or any combination of aspects described below and/or in connection with one or more other processes described elsewhere herein.

In some aspects, the resource block granularity associated with the one or more shared radio frequency spectrum channels is different from a resource block granularity associated with a licensed frequency spectrum channel. In some aspects, configuring the CORESET into the plurality of resource blocks comprises configuring the CORESET into the plurality of resource blocks based at least in part on a subcarrier spacing associated with the one or more shared radio frequency spectrum channels, or a number of subcarriers included in each resource block of the plurality of resource blocks. In some aspects, the information identifying the plurality of resource blocks comprises a plurality of bits included in a bitmap.

In a first aspect, process 700 comprises determining a first resource block, of the plurality of resource blocks, at a first edge of a first shared radio frequency channel of the one or more shared radio frequency spectrum channels, determining a second resource block, of the plurality of resource blocks, at a second edge of the first shared radio frequency channel, determining, based at least in part on a resource block index associated with the one or more shared radio frequency spectrum channels, a first offset for the first resource block, determining, based at least in part on the resource block index, a second offset for the second resource block, and selecting a subset of the plurality of bits based at least in part on the first offset and the second offset.

In a second aspect, alone or in combination with the first aspect, determining the first resource block at the first edge of the first shared radio frequency spectrum channel comprises determining a channel frequency resource block associated with a channel frequency of the first shared radio frequency spectrum channel, determining a subset of resource blocks, included in the plurality of resource blocks, on a side of the first channel frequency resource block, determining the first resource block based at least in part on the channel frequency resource block and the subset of resource blocks.

In a third aspect, alone or in combination with one or more of the first or second aspects, determining the second resource block at the second edge of the first shared radio frequency spectrum channel comprises determining a channel frequency resource block associated with a channel frequency of the first shared radio frequency spectrum channel, determining a subset of resource block groups, included in the plurality of resource blocks, on a side of the channel frequency resource block, and determining the second resource block based at least in part on the channel frequency resource block and the subset of resource block groups.

In a fourth aspect, alone or in combination with one or more of the first through third aspects, process 700 comprises determining a number of resource blocks, included in respective resource block groups of the subset of resource block groups, based at least in part on a subset of resource blocks, included in the plurality of resource blocks, on the side of the first channel frequency resource block and the resource block granularity associated with the one or more shared radio frequency spectrum channels.

In a fifth aspect, alone or in combination with one or more of the first through fourth aspects, a first shared radio frequency spectrum channel of the one or more shared radio frequency spectrum channels shares, with a second shared radio frequency spectrum channel of the one or more shared radio frequency spectrum channel, at least one of a resource block index, a number of resource blocks, or a number of resource block groups. In a sixth aspect, alone or in combination with one or more of the first through fifth aspects, the information identifying the plurality of resource blocks is included in at least one of an RRC communication, a MAC-CE communication, or a DCI communication. In a seventh aspect, alone or in combination with one or more of the first through sixth aspects, process 700 comprises communicating with the UE using the CORESET. In an eighth aspect, alone or in combination with one or more of the first through seventh aspects, communicating with the UE using the CORESET comprises transmitting, to the UE, a PDCCH communication in a control region configured by the CORESET.

In a ninth aspect, alone or in combination with one or more of the first through eighth aspects, a control channel resource allocation granularity associated with the one or more shared radio frequency spectrum channels is different from a control channel resource allocation granularity associated with a licensed frequency spectrum channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
receiving, from a base station (BS), information identifying a control resource set (CORESET) for one or more shared radio frequency spectrum channels,
wherein the CORESET includes a plurality of resource blocks based at least in part on a resource block granularity associated with the one or more shared radio frequency spectrum channels, and
wherein a location of the CORESET, in a shared radio frequency spectrum channel of the one or more shared radio frequency spectrum channels, is indicated relative to a reference frequency associated with the one or more shared radio frequency spectrum channels; and
communicating with the BS using the CORESET.

2. The method of claim 1, wherein communicating with the BS based at least in part on the CORESET comprises:
receiving, from the BS, a physical downlink control channel (PDCCH) communication based at least in part on monitoring a control region configured by the CORESET.

3. The method of claim 1, wherein a control channel resource allocation granularity associated with the one or more shared radio frequency spectrum channels is different from a control channel resource allocation granularity associated with a licensed frequency spectrum channel.

4. The method of claim 1,
wherein the reference frequency associated with the shared radio frequency spectrum channel is different from a reference frequency associated with a licensed frequency spectrum channel.

5. The method of claim 1, wherein the CORESET includes the plurality of resource blocks based at least in part on at least one of:
a subcarrier spacing associated with the one or more shared radio frequency spectrum channels, or
a number of subcarriers included in each resource block of the plurality of resource blocks.

6. The method of claim 1, wherein the information identifying the CORESET comprises:
a plurality of bits included in a bitmap,
wherein each of the plurality of bits indicates a respective subset of the plurality of resource blocks.

7. The method of claim 6, wherein a first bit, of the plurality of bits, is associated with a first resource block group that includes a starting resource block of a first shared radio frequency spectrum channel of the one or more shared radio frequency spectrum channels;
wherein a second bit, of the plurality of bits, is associated with a second resource block group that includes an ending resource block of the first shared radio frequency spectrum channel; and
wherein the first bit and the second bit are based at least in part on a third bit associated with a third resource block group that includes a resource block index associated with a bandwidth part (BWP) in which the CORESET is included.

8. The method of claim 7, wherein the first bit and the second bit are based at least in part on at least one of:
a channel frequency associated with the first shared radio frequency spectrum channel; and
a channel bandwidth associated with the first shared radio frequency spectrum channel.

9. The method of claim 6, wherein the plurality of bits included in the bitmap is based at least in part on at least one of:
the resource block granularity that is used to configure the CORESET,
a number of resource blocks included in the plurality of resource blocks,
a number of resource block groups included in the plurality of resource blocks,
a respective number of resource blocks, on each side of a channel frequency associated with a first shared radio frequency spectrum channel of the one or more shared radio frequency spectrum channels, included in the CORESET, or
a respective number of resource block groups, on each side of the channel frequency associated with the first shared radio frequency spectrum channel, included in the CORESET.

10. The method of claim 1, wherein a first shared radio frequency spectrum channel of the one or more shared radio frequency spectrum channels shares, with a second shared radio frequency spectrum channel of the one or more shared radio frequency spectrum channels, at least one of:
a resource block index,
a number of resource blocks, or
a number of resource block groups.

11. The method of claim 1, wherein the information identifying the CORESET is included in at least one of:
a radio resource control (RRC) communication,
a medium access control control element (MAC-CE) communication, or
a downlink control information (DCI) communication.

12. A method of wireless communication performed by a base station (BS), comprising:
configuring, based at least in part on a resource block granularity associated with one or more shared radio frequency spectrum channels, a control resource set (CORESET) for the one or more shared radio frequency spectrum channels into a plurality of resource blocks,
wherein a location of the CORESET, in a shared radio frequency spectrum channel of the one or more shared radio frequency spectrum channels, is indicated relative to a reference frequency associated with the one or more shared radio frequency spectrum channels; and
transmitting, to a user equipment (UE), information identifying the plurality of resource blocks.

13. The method of claim 12, wherein a control channel resource allocation granularity associated with the one or more shared radio frequency spectrum channels is different from a control channel resource allocation granularity associated with a licensed frequency spectrum channel.

14. The method of claim 12, wherein configuring the CORESET into the plurality of resource blocks comprises:
configuring the CORESET into the plurality of resource blocks based at least in part on:
a subcarrier spacing associated with the one or more shared radio frequency spectrum channels, or
a number of subcarriers included in each resource block of the plurality of resource blocks.

15. The method of claim 12, wherein the information identifying the plurality of resource blocks comprises:
a plurality of bits included in a bitmap.

16. The method of claim 15, further comprising:
determining a first resource block, of the plurality of resource blocks, at a first edge of a first shared radio frequency channel of the one or more shared radio frequency spectrum channels;

determining a second resource block, of the plurality of resource blocks, at a second edge of the first shared radio frequency channel;

determining, based at least in part on a resource block index associated with the one or more shared radio frequency spectrum channels, a first offset for the first resource block;

determining, based at least in part on the resource block index, a second offset for the second resource block; and selecting a subset of the plurality of bits based at least in part on the first offset and the second offset.

17. The method of claim 16, wherein determining the first resource block at the first edge of the first shared radio frequency spectrum channel comprises:

determining a channel frequency resource block associated with a channel frequency of the first shared radio frequency spectrum channel;

determining a subset of resource blocks, included in the plurality of resource blocks, on a side of the first channel frequency resource block; and determining the first resource block based at least in part on:
the channel frequency resource block, and
the subset of resource blocks.

18. The method of claim 16, wherein determining the second resource block at the second edge of the first shared radio frequency spectrum channel comprises:

determining a channel frequency resource block associated with a channel frequency of the first shared radio frequency spectrum channel;

determining a subset of resource block groups, included in the plurality of resource blocks, on a side of the channel frequency resource block; and determining the second resource block based at least in part on:
the channel frequency resource block, and
the subset of resource block groups.

19. The method of claim 18, further comprising:

determining a number of resource blocks, included in respective resource block groups of the subset of resource block groups, based at least in part on:
a subset of resource blocks, included in the plurality of resource blocks, on the side of the first channel frequency resource block; and
the resource block granularity associated with the one or more shared radio frequency spectrum channels.

20. The method of claim 12, wherein a first shared radio frequency spectrum channel of the one or more shared radio frequency spectrum channels shares, with a second shared radio frequency spectrum channel of the one or more shared radio frequency spectrum channels, at least one of:
a resource block index,
a number of resource blocks, or
a number of resource block groups.

21. The method of claim 12, wherein the information identifying the plurality of resource blocks is included in at least one of:
a radio resource control (RRC) communication,
a medium access control control element (MAC-CE) communication, or
a downlink control information (DCI) communication.

22. The method of claim 12, further comprising:
communicating with the UE using the CORESET.

23. The method of claim 22, wherein communicating with the UE using the CORESET comprises:
transmitting, to the UE, a physical downlink control channel (PDCCH) communication in a control region configured by the CORESET.

24. A user equipment (UE) for wireless communication, comprising:
a memory; and
one or more processors, coupled to the memory, to:
receive, from a base station (BS), information identifying a control resource set (CORESET) for one or more shared radio frequency spectrum channels,
wherein the CORESET includes a plurality of resource blocks based at least in part on a resource block granularity associated with the one or more shared radio frequency spectrum channels, and
wherein a location of the CORESET, in a shared radio frequency spectrum channel of the one or more shared radio frequency spectrum channels, is indicated relative to a reference frequency associated with the one or more shared radio frequency spectrum channels; and
communicate with the BS using the CORESET.

25. The UE of claim 24,
wherein the reference frequency associated with the shared radio frequency spectrum channel is different from a reference frequency associated with a licensed frequency spectrum channel.

26. The UE of claim 24, wherein the information identifying the CORESET comprises:
a plurality of bits included in a bitmap,
wherein each of the plurality of bits indicates a respective subset of the plurality of resource blocks.

27. The UE of claim 26, wherein the plurality of bits included in the bitmap is based at least in part on a number of resource block groups included in the plurality of resource blocks.

28. The UE of claim 24, wherein a first shared radio frequency spectrum channel of the one or more shared radio frequency spectrum channels shares, with a second shared radio frequency spectrum channel of the one or more shared radio frequency spectrum channels, at least one of:
a resource block index,
a number of resource blocks, or
a number of resource block groups.

29. A base station (BS) for wireless communication, comprising:
a memory; and
one or more processors, coupled to the memory, to:
configure, based at least in part on a resource block granularity associated with one or more shared radio frequency spectrum channels, a control resource set (CORESET) for the one or more shared radio frequency spectrum channels into a plurality of resource blocks,
wherein a location of the CORESET, in a shared radio frequency spectrum channel of the one or more shared radio frequency spectrum channels, is indicated relative to a reference frequency associated with the shared radio frequency spectrum channels; and
transmit, to a user equipment (UE), information identifying the plurality of resource blocks.

30. The BS of claim 29, wherein a control channel resource allocation granularity associated with the one or more shared radio frequency spectrum channels is different from a control channel resource allocation granularity associated with a licensed frequency spectrum channel.

31. The BS of claim 29, wherein the information identifying the plurality of resource blocks comprises:
a plurality of bits included in a bitmap,
wherein each of the plurality of bits indicates a respective subset of the plurality of resource blocks.

* * * * *